Jan. 1, 1963　　　A. G. STIMSON ET AL　　　3,071,055
PHOTOELECTRIC EXPOSURE CONTROL IN CAMERA
Filed Aug. 9, 1961　　　　　　　　　　　　2 Sheets-Sheet 1

Allen G. Stimson
Gerald F. Pickens
INVENTORS

BY R. Frank Smith
Robert W. Hampton
ATTORNEYS

Jan. 1, 1963  A. G. STIMSON ET AL  3,071,055
PHOTOELECTRIC EXPOSURE CONTROL IN CAMERA
Filed Aug. 9, 1961  2 Sheets-Sheet 2

Allen G. Stimson
Gerald F. Pickens
INVENTORS

BY R. Frank Smith
Robert W. Hampton
ATTORNEYS 3,071,055
PHOTOELECTRIC EXPOSURE CONTROL
IN CAMERA
Allen G. Stimson, and Gerald F. Pickens, both of Rochester, N.Y., assignors to Eastman Kodak Company, Rochester, N.Y., a corporation of New Jersey
Filed Aug. 9, 1961, Ser. No. 130,301
7 Claims. (Cl. 95—10)

The present invention relates to photographic cameras and more particularly concerns photoelectric exposure control systems for such cameras.

An object of the present invention is to control both lens aperture and shutter speed of a camera photoelectrically.

Another object of the invention is to provide an extremely simple, rugged and inexpensive photoelectric exposure control system for a camera.

A further object of the invention is to employ as both a shutter and a diaphragm a single, apertured disk, to rotate the disk partially for a camera, past the camera taking lens, and to control photoelectrically the extent of such rotation.

These and other objects of the invention will appear from the following description, reference being made to the accompanying drawings, wherein.

Figure 1:
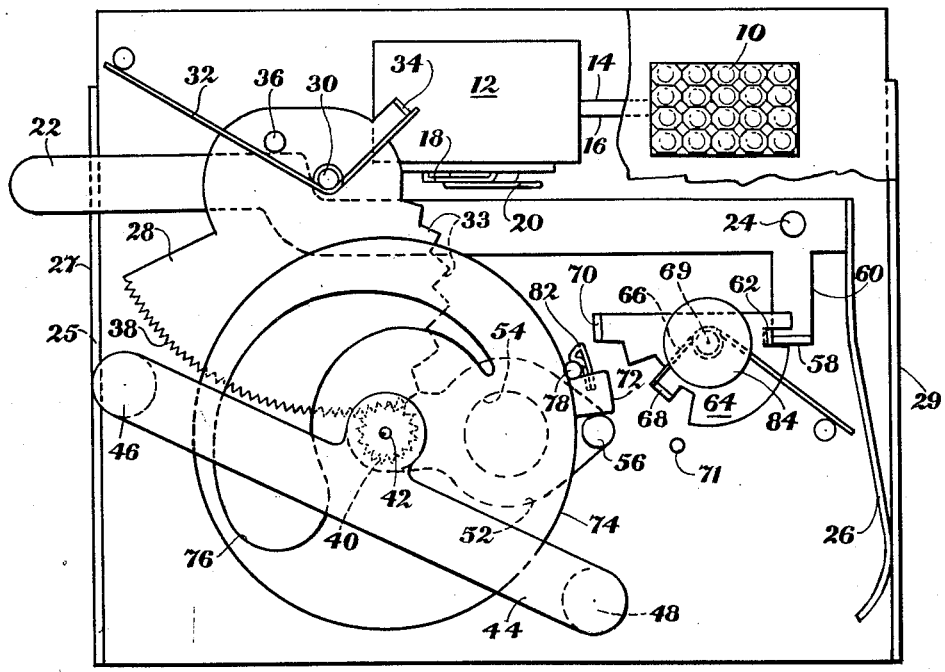
FIG. 1 is a partial front view of a camera with the front cover removed showing the elements of the invention in their initial positions.
Figure 2:
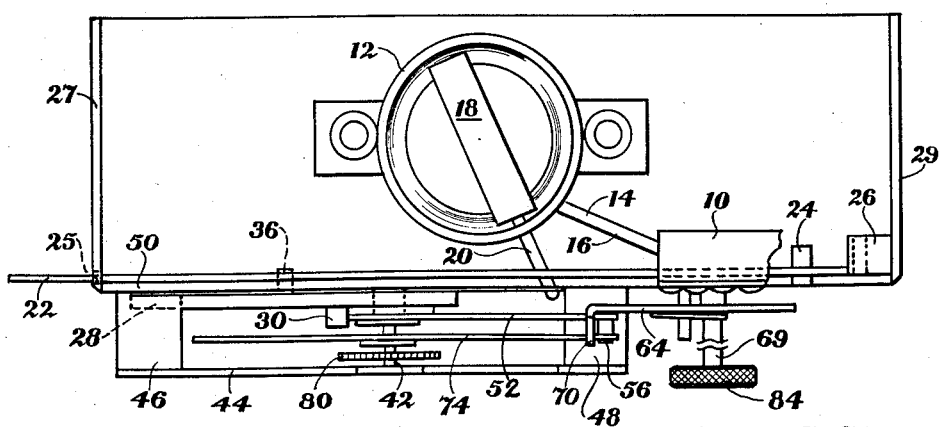
FIG. 2 is a top view of a portion of the mechanisms shown in FIG. 1.

Referring to FIGS. 1 and 2, a camera embodying the present invention includes a photocell 10 connected to an electric measuring instrument by a pair of leads 14 and 16. The instrument 12 has a pivoted coil 18 carrying a pointer 20. The instrument and photocell together constitute an exposure meter of the type well known in the art.

A camera actuating lever, or member, 22, is pivoted at 24 and extends through a suitable aperture 25 in a camera wall 27. The actuating lever is thereby accessible for manual depression by the camera operator. A spring 26, which is integral with the actuating lever 22, bears against the inner surface of a camera wall 29 and urges lever 22 clockwise about its pivot 24, thereby normally maintaining the lever in its initial position, as shown in FIG. 1.

A control, or sensing member 28 is formed as a flat plate pivoted at 30. A spring 32 cooperates with an ear 34 on member 28 for urging the latter in a counterclockwise direction, such that a pin 36 on member 28 bears against an upper surface of the actuating lever 22. Spring 26 is stronger than spring 32 and therefore normally maintains the latter in a fully tensioned state, with member 28 in its maximum clockwise position, as shown in FIG. 1.

A gear segment 38 on member 28 cooperates with a spur gear 40, which is secured to a shaft 42. One end of shaft 42 is supported by a brace 44 mounted by a pair of posts 46 and 48 on a camera frame member 50. The other end of shaft 42 is mounted on frame 50. A stop member 52, which acts as a cover member for the camera taking lens, indicated at 54, is integral with spur gear 40 and is rotatable therewith. A stop pin 56 extends from member 52 and limits the exposure in a manner hereinafter described.

An ear 58 on an arm 60 of the actuating lever 22 cooperates with a notch 62 of a hammer 64 for maintaining the latter in its maximum clockwise position (as shown in FIG. 1) about a pivot 69. A spring 66 cooperates with an ear 68 on the hammer for urging the latter in a counterclockwise direction about pivot 69. When the hammer is released from its latched position, as later described, an ear 70 thereon cooperates with an upper, driving surface of an ear 72 on a disk 74. This disk is rotatably mounted on shaft 42 and has an aperture 76, illustrated as having an arcuate, tapered shape. Disk 74 normally is maintained in its counterclockwise position, with ear 72 abutting a stop 78, by a spring 80 (FIG. 2), and is latched in that position by a spring member 82 secured to ear 72 of the disk. The aperture 76 in disk 74 functions as both a diaphragm and a shutter, as will appear from the following description of the operation of the apparatus described above.

When the camera is aimed at a photographic subject, the photocell 10 energizes the instrument 12 to move pointer 20 to a position which is a function of scene, or field brightness. The tip of pointer 20 moves further to the left, as viewed in FIG. 1, in response to greater scene brghtness. Manual depression of the outer end of actuating lever 22 rotates this lever counterclockwise about its pivot 24 against the tension of spring 26, thereby permitting spring 32 to drive member 28 counterclockwise for rotating spur gear 40 and cover member 52 clockwise, while pin 36 follows the upper surface of lever 22. A series of teeth 33 on member 28 cooperate with pointer 20 for stopping the counterclockwise motion of member 28 at a position representing field brightness. Therefore, the spur gear 40 and cover member 52 also stop at the positions corresponding to field brightness.

Figure 3:
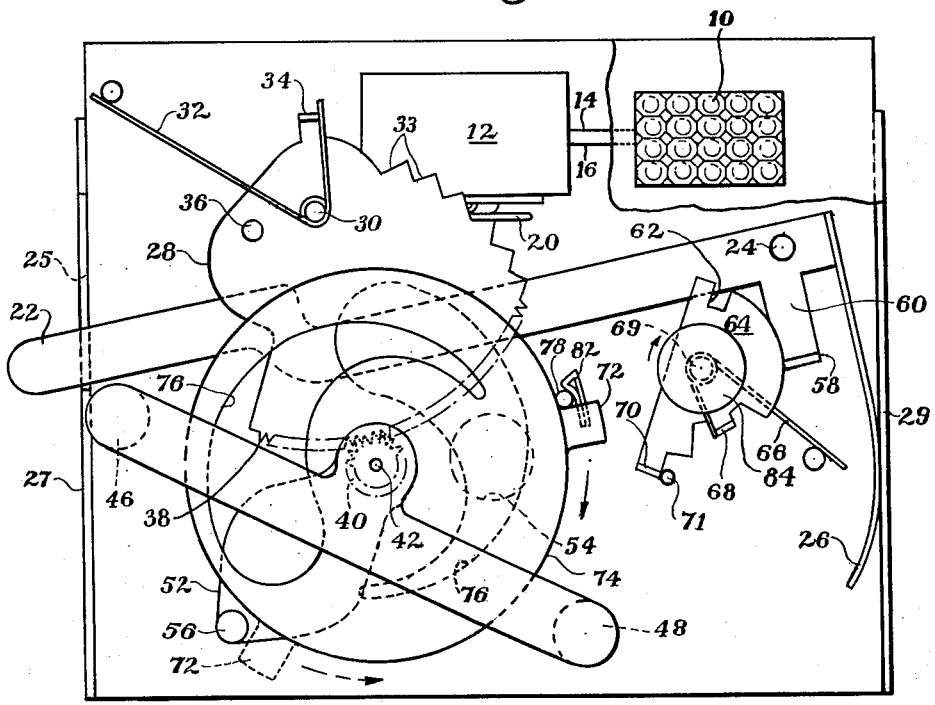
FIG. 3 is a view similar to FIG. 1, showing the elements in their operated positions.

Full depression of actuating lever 22, as shown in FIG. 3, moves ear 58 out of notch 62, thereby permitting spring 66 to drive the hammer 64 counterclockwise to its stop 71. During the movement of hammer 64, its ear 70 hits the upper, or driving surface of ear 72 on disk 74, thereby disengaging the spring latch 82 from pin 78 and driving disk 74 clockwise. The clockwise movement of disk 74 is limited when the lower, or stopping surface of ear 72 engages pin 56 on stop member 52, as shown in dashed lines in FIG. 3. Ear 72 and disk 74 then rebound from pin 56 resiliently and return to their initial positions wherein spring latch 82 engages pin 78 to retain the disk in its initial, or extreme counterclockwise position. The rebounding action of disk 74 is aided by spring 80 (FIG. 2).

During the forward and rebound motion of disk 74, its aperture 76 moves in a path carrying at least a part of that aperture into axial alignment with the taking lens 54. The further clockwise the stop member 52 and its pin 56 were moved during the initial depression of the actuating lever 22 the greater portion of aperture 76 that moves into coincidence with the taking lens 54. It will be noted that the narrowest portion of aperture 76 first moves into coincidence with the taking lens 54, followed by successively wider portions of that aperture. This corresponds, of course, to successively lower values of field brightness, as represented by successive rightward positions of pointer 20, successive counterclockwise positions of control member 28 and successive clockwise positions of stop member 52 and its pin 56. It will be obvious that the duration of the coincidence of aperture 76 and lens 54, i.e., the duration of the photographic exposure, also is a function of the position of pin 56 and therefore of field brightness. The shape of aperture 76 and the inertia of the various moving parts, as well as the tension of spring 80, may be chosen such that the combination of exposure time and the average size of the exposure aperture properly expose film in the camera for each value of field brightness within the range of camera operation.

Figure 4:
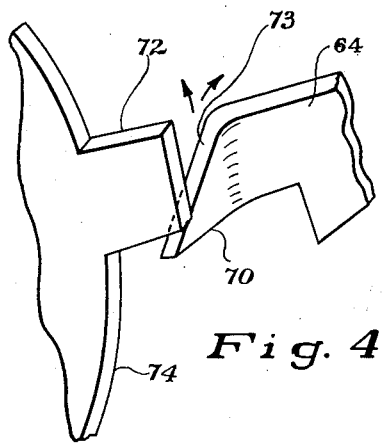
FIG. 4 is a detailed isometric view of a portion of the latching member, showing its recocking movement.

In order to prepare for a subsequent exposure the hammer may be recocked by manually rotating a knurled knob 84, which is integral with the hammer shaft 69, and which is adapted to move the hammer clockwise until ear 58 on the actuating lever re-engages notch 62 on the hammer and holds the latter in its maximum clockwise position. During this movement, ear 70 on the hammer, which is shown in detail in FIG. 4, engages the lower surface of ear 72 on disk 74. The upper surface 73 of ear 70 is cam shaped and springs the entire lefthand portion of the hammer inwardly while ear 70 travels upwardly, as indicated by the two arrows in FIG. 4. Alternatively, a "live tip" may be provided on the hammer in lieu of the cam-shaped ear 70.

The invention has been described in detail with particular reference to preferred embodiments thereof, but it will be understood that variations and modifications can be effected within the spirit and scope of the invention as described hereinabove and as defined in the appended claims.

We claim:
1. In a camera having a taking lens disposed on an optical axis and having a photoelectric exposure meter including a member movable as a function of field brightness, the combination comprising: a rotatable disk having an arcuate, tapered aperture, and having an initial position in which said aperture is out of axial alignment with said lens; drive means for rotating said disk away from its initial position in a direction for aligning successively wider portions of said aperture with said lens; means controlled by said movable member for limiting the amount of rotation of said disk away from its initial position as a function of field brightness, thereby limiting the portion of said aperture that moves into axial alignment with said lens, for establishing an exposure aperture, and an exposure duration dependent upon the amount of movement of said disk away from its initial position, and means for returning said disk to its initial position.

2. The combination defined in claim 1, wherein said disk has a driving surface, and wherein said drive means comprises a hammer, and spring means for impelling said hammer into contact with said driving surface; with: means for latching said hammer in a rest position out of contact with said driving surface; a manually operable camera actuating member; and means controlled by said actuating member, upon operation of the latter, for releasing said latching means.

3. The combination defined in claim 2, with means for resetting said hammer to its rest position following release of said latching means.

4. The combination defined in claim 2, wherein said disk has a stopping surface, and wherein said limiting means includes: a control member having a stepped surface adapted to sense the position of said movable member, said control member being coupled to said actuating member for movement of said stepped surface into engagement with said movable member in response to operation of said actuating member; and a stop member coupled to said control member and differentially positioned thereby as a function of the sensing position of said control member, said stop member being engageable by the stopping surface of said disk for limiting the movement of the latter.

5. The combination defined in claim 1, wherein said limiting means comprises: a control member adapted for differential movement to sense the position of said movable member; and a stop member coupled to said control member and positioned thereby as a function of the sensing position of said control member, said stop member being disposed in cooperative relation with said disk for stopping movement of the latter.

6. The combination defined in claim 5, wherein a stopping surface on said disk engages said stop member resiliently for impelling said disk back toward its initial position.

7. In a camera having a taking lens disposed on an optical axis and having a photoelectric exposure meter including a member movable as a function of field brightness, means for controlling both aperture stop and exposure time as combined functions of field brightness, comprising: a rotatable disk having an arcuate, tapered aperture, and having an initial position in which said aperture is out of axial alignment with said lens; drive means for rotating said disk away from its initial position in a direction for aligning successively wider portions of said aperture with said lens; means controlled by said movable member for limiting the amount of rotation of said disk away from its initial position as a function of field brightness, thereby limiting the portion of said aperture that moves into axial alignment with said lens, for establishing an exposure aperture; and means for impelling said disk back toward its initial position automatically upon the operation of said limiting means, thereby limiting the exposure duration.

References Cited in the file of this patent
UNITED STATES PATENTS
2,531,936   Fairbank _____ Nov. 28, 1950
FOREIGN PATENTS
1,231,886   France _____ Apr. 19, 1960
231,119    Australia _____ Oct. 27, 1960
(Corresponding to France No. 1,231,886)